4 Sheets--Sheet 2.

F. TAYLOR.
Ditching-Machine.

No. 167,805.  Patented Sept. 14, 1875.

Attest.
Thomas E. Chandler
Wm H. Schmitt

Inventor:
Franklin Taylor

4 Sheets--Sheet 4.

F. TAYLOR.
Ditching-Machine.

No. 167,805. Patented Sept. 14, 1875.

Attest:
Thomas E. Chandler
Wm. H. Schmitt

Inventor:
Franklin Taylor

UNITED STATES PATENT OFFICE.

FRANKLIN TAYLOR, OF INDIANAPOLIS, INDIANA, ASSIGNOR TO HIMSELF AND THOMAS E. CHANDLER, OF SAME PLACE.

IMPROVEMENT IN DITCHING-MACHINES.

Specification forming part of Letters Patent No. 167,805, dated September 14, 1875; application filed June 5, 1875.

*To all whom it may concern:*

Be it known that I, FRANKLIN TAYLOR, of the city of Indianapolis, in the county of Marion and State of Indiana, have invented certain new and useful Improvements in Ditching-Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1:
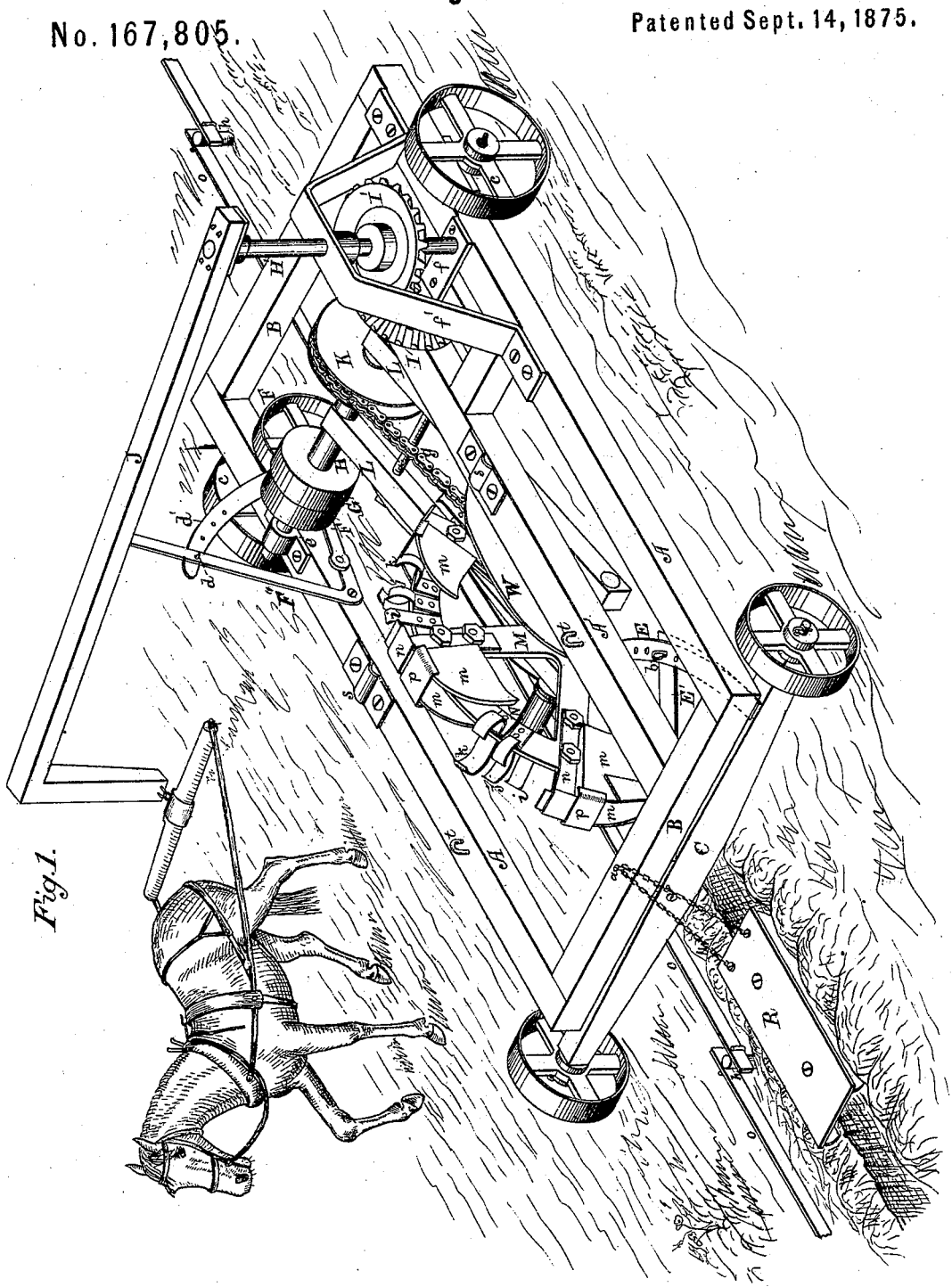
Figure 2:
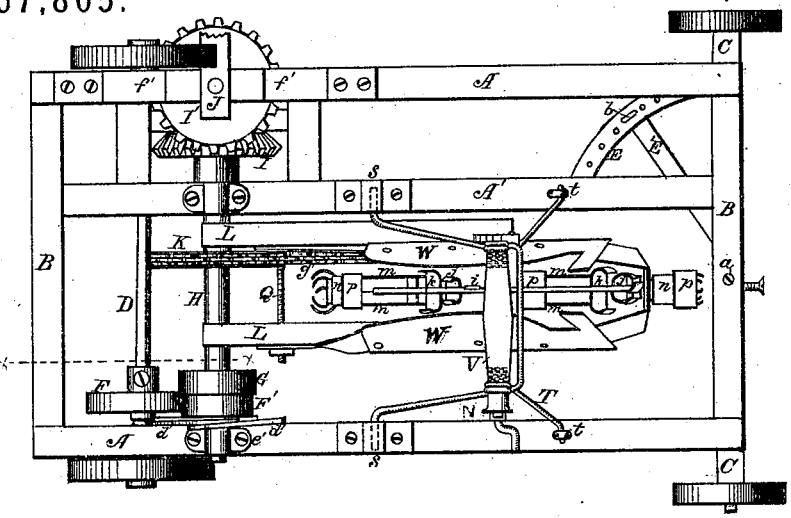
Figure 3:
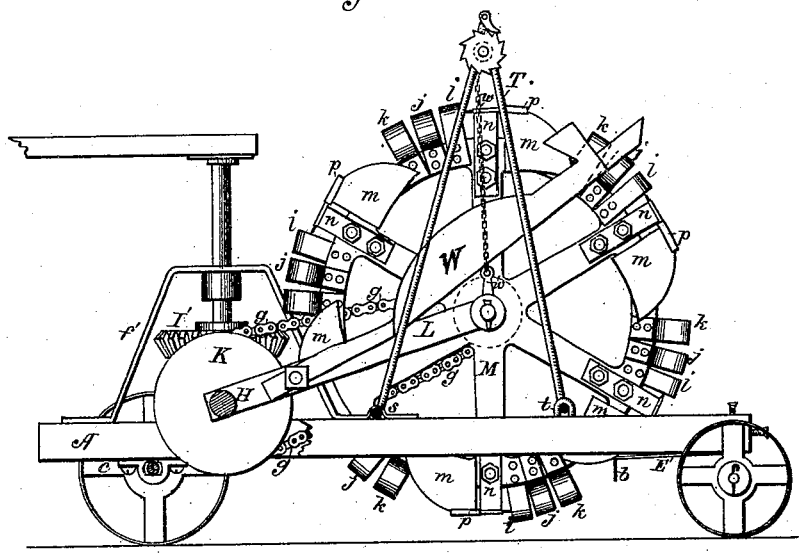
Figure 4:
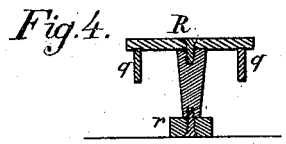
Figure 5:
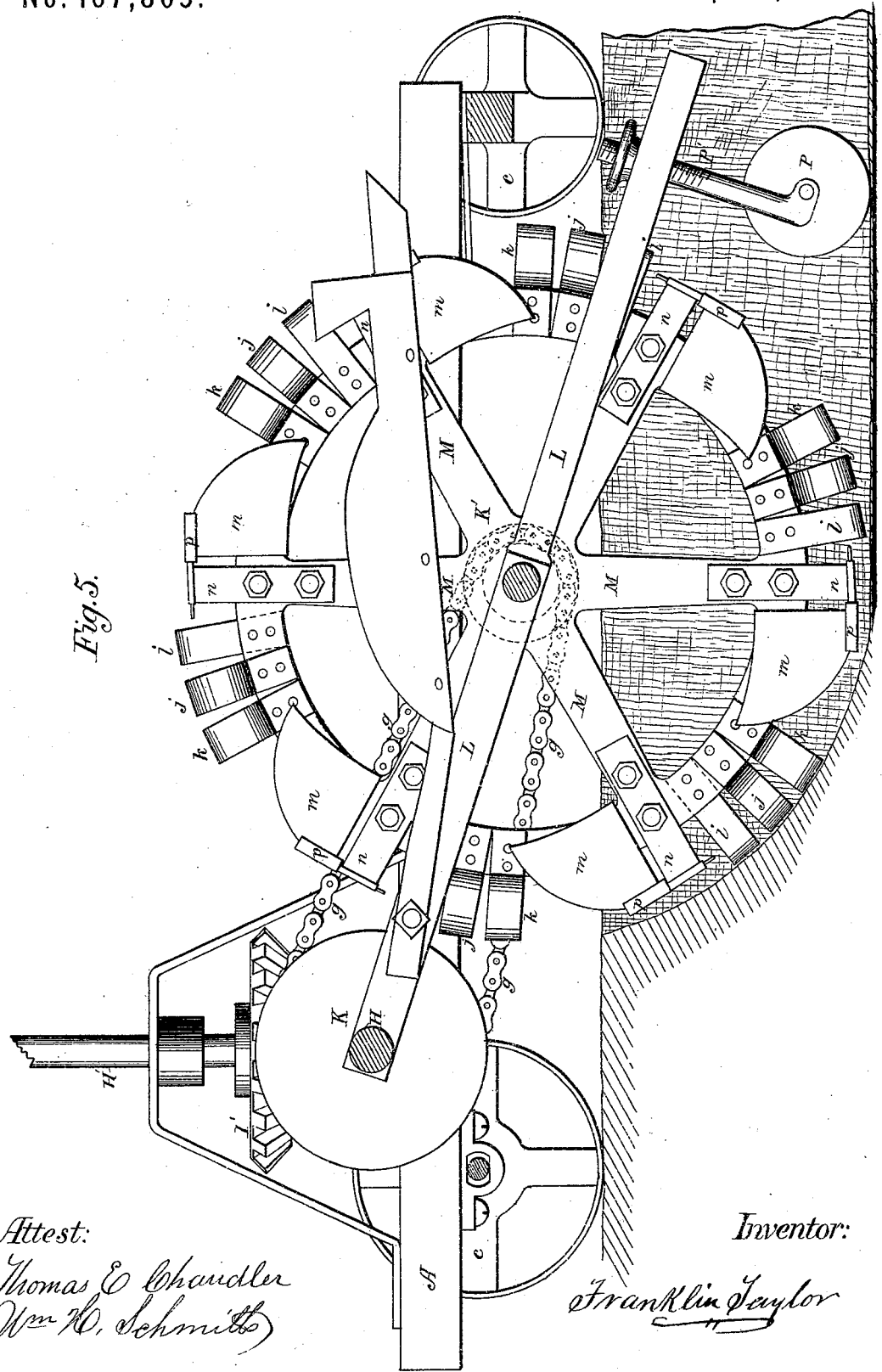
Figure 6:
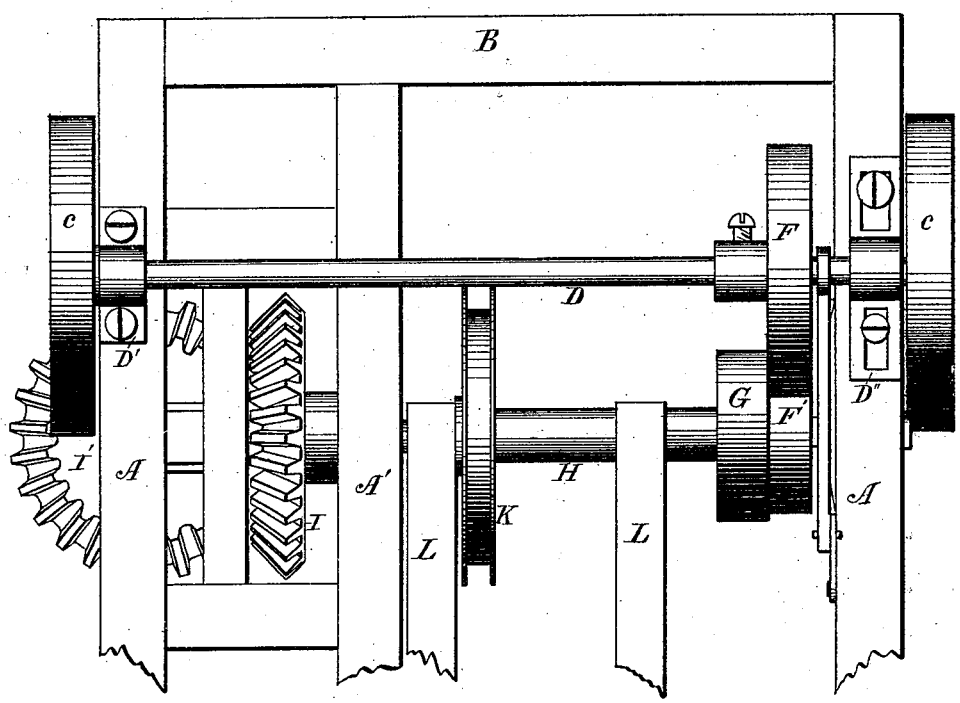
Figure 7:
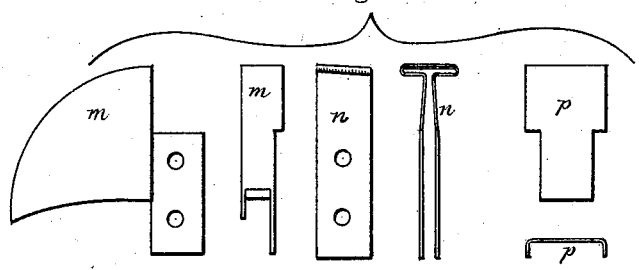
Figure 8:
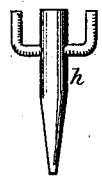

Figure 1 is a perspective view of the machine in operation, it being put in motion by horse-power. Fig. 2 is a plan, showing the relative arrangement of the parts. Fig. 3 is a side elevation, shown partly in section upon the line $x$ $x$ of Fig. 2. Fig. 4 represents a side view and section on the line $y$ $y$ of the traveling-bridge, used when the machine is operated by animal power. Fig. 5 presents a vertical section, showing a modification of the means used for regulating the depth of the ditch. Fig. 6 shows a part of the under side of the machine, illustrating the method of operating the frictional gearing. Fig. 7 shows the various devices composing one of the shovels in detail, and Fig. 8 represents one of the grade-pins.

This invention relates to that class of ditching-machines in which the earth is removed, and the ditch formed by a revolving wheel armed at its periphery with suitable devices for first loosening and then raising the earth from the ditch, and delivering it upon one or both sides, the whole apparatus traveling forward as the ditch is excavated, throwing the earth out, and giving to its bottom and sides an even grade and smooth surface, the machine being operated by either steam or animal power, the object being to produce a ditching-machine which shall be effective, and not so costly as to forbid its introduction into general use; and the invention consists in the construction, combination, and arrangement of the different parts of the machine, as will be hereinafter fully described, and then specifically pointed out in the claims.

The main frame of the machine is composed of three longitudinal pieces, A A A', connected at each end by the cross-pieces B B. This frame rests upon the axles C and D, the first of which, C, is provided with suitable wheels of broad tread, to enable them to support the weight of the machine without sinking in soft ground, and it oscillates upon a central pin or king-bolt at $a$, and is also provided with means by which it may be fixed in any desired position, consisting of the pin $b$ passing through holes in the curved bar E, which is attached to the frame of the machine, and through corresponding holes in the quadrant E', secured upon the axle C. This method of construction enables the operator to cause the machine to follow curves of varying radii with certainty; also, in following a straight line, to keep it steady, and moving directly forward; and when the pin is removed altogether the parts act like the wear-irons on an ordinary running-gear for wagons in transporting the machine from place to place. The axle D revolves in suitable journal-boxes D' and D'', secured to the side pieces A of the frame, the wheels $c$ $c$ upon its ends being firmly attached to and revolving with the axle. A friction-pulley, F, is also secured upon the axle through which it receives motion when the machine is in operation.

In order to produce this result the journal-box D' is so constructed as to allow lateral motion of the axle, and the box D'' is provided with slots, through which the securing-bolts pass, thus allowing it to have a sliding movement, carrying the axle and friction-pulley with it. Attached to this journal-box, or encircling the axle, is a connecting-bar, F', the other end of which is secured by a pivotal connection to the lever F''. This lever may be made to bring the friction-pulley F into or throw it out of contact with the friction-pulley G upon the main driving-shaft H of the machine, and, when in the desired position, hold it there by means of the pin $d$ passing through it and one of a series of holes in the curved bar $d'$. The driving-shaft H is carried in journal-boxes $e$ and $e'$ upon the frame-pieces A and A', and has secured upon its inner end the bevel-gear I, which engages with the gear I' upon the vertical shaft H', the lower end of which rests in the step $f$ upon the frame, and is further retained in its vertical position by the support $f'$, which is securely bolted to the side piece A of the framing. Upon the upper end of this vertical shaft is secured the sweep J, to which the animals may be attached for the purpose of operating the machine, as shown in Fig. 1, but should steam-power be used the vertical shaft may be dispensed with and the engine connected directly to the shaft H. Upon the driving-shaft H is also secured a chain-wheel, K, and upon the shaft, each side of it, are journaled one of the ends of the side pieces L of a frame carrying the excavating-wheel M, which is driven by the chain $g$ from the chain-wheel K, passing over a similar chain-wheel, K', attached to the hub of the excavating-wheel. One end of the shaft upon which the excavating-wheel is carried extends outward beyond the adjustable frame carrying the wheel, and is provided with a spool, N, which revolves loosely upon the shaft, and serves, in connection with the grade-rails O, to regulate the depth of the excavation. These rails are supported upon grade-pins $h$, which are provided with clamps for the reception of the rails, as shown in Fig. 8, the grade-pins being driven into the earth at a distance from each other nearly equal to the length of the grade-rails, upon the line of the proposed ditch, their tops being at a certain specified height from that of its intended bottom, and, the rails being then placed in position in the clamps, they serve as a support upon which the spool N travels, thus causing the bottom of the ditch to assume a perfectly uniform grade, corresponding to that of the rails, and which will be perfectly correct if they have been properly placed. It sometimes happens that very sharp curves are to be turned, or the surface of the earth is nearly uniform with the grade of the proposed ditch. In such cases the devices shown in Fig. 5 may be employed in place of the grade-rails. These devices consist of a guide-wheel, P, which rests upon the bottom of the ditch, and is secured in the lower end of an adjustable standard, P', attached to and passing through the rear end of the supporting-frame of the excavating-wheel. This wheel M is composed of a metallic rim supported by spokes radiating from a central hub, the rim being provided at suitable distances, and projecting from its periphery, with a series of curved blades, $i\ j\ k$. The first of the series, $i$, being single and but slightly curved, penetrates the earth easily, nearly in the middle of the proposed ditch. The second of the series, $j$, are in pairs, and have a greater curvature than the first. They are also placed so as to travel in a path outside of and between that of the first blade and the side of the ditch. The remaining pair of blades $k$ are similar to those last described, but are so set as to cut to the full width of the ditch. The peculiar shape and position of these thin blades with relation to the earth to be penetrated when in operation enable them to perform their work with great facility, and to so thoroughly loosen the earth that it may be readily removed by the excavating shovels or scoops.

The thin cutting-points of these blades are so bent at an angle to the radius of the ditching-wheel as to strike the earth at an angle of thirty degrees, or thereabout, from the line of the ditch, or the surface operated upon. The angle is intended to be such that the earth will most readily yield upward and backward from the point of the blade as it passes through, thus doing its work with the least resistance, and completely pulverizing and loosening it in a rapid and economical manner preparatory to its being lifted out of the ditch by the shovels or scoops.

It will be evident that the number and position of these blades must depend to a great extent upon the nature of the soil to be loosened and removed, and also upon the size of the ditch to be excavated.

In the rear of each series of loosening-blades is placed a shovel or scoop, which removes and elevates the earth. These shovels are each composed of two quadrant-shaped side pieces, $m$, secured to the wheel by bolts passing through them and the spokes and rim of the wheel, and also through a clamp, $n$, thus securing the whole firmly together by one set of bolts. The clamp $n$ is provided with a T-shaped head, which forms a socket for the reception of the scrapers $p$. These scrapers are placed tangentially to the periphery of the wheel, therefore scrape and clean out, as the wheel revolves, the loosened earth from the ditch. The earth is gathered into the shovel by the scraper on the outer rim of the ditching-wheel, being moved forward and upward in the direction of the breast of earth, and closely following the cutting-blades, and receiving the loosened earth directly from them. This earth is deposited by means of its gravity from the back or inner side of the shovel onto the double apron W that is prepared to receive it; but in order to prevent the earth from leaving the shovel before it is carried to the proper height by the wheel, the rear end of the bottom of the shovel is elevated at such an angle with the other portion of the floor of the shovel as to retain the earth until it is carried to the desired height. It is then carried upward by the shovels until it has passed the highest point of the wheel, when it falls from them upon the oblique double apron W, the two halves of which are connected by a metallic strap at one end, their opposite ends being pivoted upon the cross-bar Q, which forms a connection for the two side pieces L of the wheel-frame.

This method of attachment enables the vertical adjusting of the apron to be regulated to suit the circumstances under which the machine may be working.

The object of the apron W is to receive the earth from the shovel or scoop; and to form an easy chute on either side of the wheel to conduct the earth outward sufficiently far to be clear of the ditch.

A portable bridge, R, provided with side pieces q, and downward projections carrying the guide-rolls r, as shown in Fig. 4, is attached to the machine, and moves with it when it is operated by animal power, for the purpose of enabling the team to pass the ditch in the rear of the machine; but when operated by steam-power this might be dispensed with, its only use at such times being to afford a convenient means of crossing to the operators where the ditch is large.

Removably attached to the side pieces A, by means of the boxes s and staples t, are two frames, T, which support a windlass, V, of barrel form, or, rather, a double cone shape. This shape causes the chains winding upon it to lie regularly and without riding. It is provided with a crank at one end, as well as a pawl-and-ratchet wheel. This windlass serves, through the agency of the chains w, which are attached to it, and to the swivels w' upon the axle of the excavating-wheel, to raise the wheel from the ground when the machine is to be moved from place to place.

In operating this machine, the ditch is first located, the grade pins and rails placed in their proper position, (if they are to be used;) the machine is then brought into position, and the excavating-wheel put in motion. It may then be gradually lowered, by means of the windlass, until the spool rests upon the grade-rail, or the desired depth is reached. The friction-pulley F is then, by means of the lever d and its connections, brought into forcible contact with the pulley G upon the main driving-shaft, thus putting the wheels c c upon the axle D in motion, and forcing forward the whole machine.

It is evident that friction-pulleys of different sizes may be used upon the main shaft H, thus giving to the machine different rates of speed in its forward movement, or spur-gears might be used for the same purpose; but I prefer the frictional gearing, as being less liable to accident and sufficiently effective.

Having thus described my machine, I claim as new, and desire to secure by Letters Patent, the following:

1. The vertically-adjustable excavating-wheel, provided with a series of curved loosening blades and shovels, i, j, and k, in combination with the frame L, chain-wheels K and K', chain g, and driving-shaft H, substantially as and for the purpose set forth.

2. The shovel, composed of the side pieces m, clamp n, and scraper p, attached to the wheel M, substantially as and for the purpose set forth.

3. In a ditching-machine, the driving-axle D, revolving in adjusting journal-boxes, and provided with friction-wheel F, in combination with the connections F', lever F'', and friction-wheel G, upon the driving-shaft H, as and for the purpose set forth.

4. The portable bridge R, provided with the guiding-rollers r and side pieces q, as and for the purpose specified.

5. The double cone windlass V, provided with a crank and ratchet, and mounted upon the removable frame T, in combination with the chains w, swivels w', and wheel M, as and for the purpose set forth.

6. The grade-rails O, in combination with the grade-pins h, provided with clamps for the reception of the rails, as shown and described.

7. The combination of the excavating-wheel M, provided with curved loosening blades and shovels, with the pivoted oblique double apron W, arranged substantially as shown and specified.

In testimony that I claim the foregoing as my invention I hereunto affix my signature in the presence of two witnesses this 24th day of May, 1875.

FRANKLIN TAYLOR.

Witnesses:
 THOMAS E. CHANDLER,
 WM. H. SCHMITTS.